United States Patent [19]

Wilson

[11] Patent Number: 5,116,580
[45] Date of Patent: May 26, 1992

[54] GAS GENERATING APPARATUS AND A METHOD OF FEEDING LIQUID THERETO

[76] Inventor: Robert W. Wilson, 2128 Forest Dr., E., Charlotte, N.C. 28211

[21] Appl. No.: 256,712

[22] Filed: Oct. 12, 1988

[51] Int. Cl.⁵ ............................................... B01J 7/00
[52] U.S. Cl. .................................. 422/111; 222/185; 422/305
[58] Field of Search .............. 422/305, 218, 111; 222/185, 56, 564; 48/118.5; 261/72.1

[56] References Cited

U.S. PATENT DOCUMENTS

| | | | |
|---|---|---|---|
| 991,568 | 5/1911 | Walter | 222/185 X |
| 1,018,924 | 2/1912 | Patnaude | 222/185 X |
| 1,591,623 | 7/1926 | Hassensall | 222/185 |
| 1,993,982 | 3/1935 | Wolfe | 222/185 X |
| 2,078,202 | 4/1937 | Manning | 422/305 X |
| 3,951,610 | 4/1976 | Freebairn et al. | 48/118.5 X |
| 4,408,701 | 10/1983 | Jeans | 222/185 |

FOREIGN PATENT DOCUMENTS 5237 of 1897 United Kingdom ............... 422/305

Primary Examiner—Richard L. Chiesa
Attorney, Agent, or Firm—Shefte, Pinckney & Sawyer

[57] ABSTRACT

A gas generator having a reservoir from which liquid is fed to a gas generating chamber in selective feeding arrangements. In one method the liquid is poured into the reservoir for feeding at a decreasing pressure head. In a second selective feeding method a bottle of supply liquid is inverted in the reservoir for feeding at a generally uniform pressure head. In another method liquid is first placed in the reservoir and the inverted bottle is partially submerged in the liquid for initial feeding at a decreasing pressure head during depletion of the liquid in the reservoir between the bottle and the walls of the reservoir, followed by feeding at a generally uniform pressure head during depletion of liquid from within the bottle. The liquid can also be selectively fed by first filling the reservoir and then placing an inverted large bottle of liquid on top of the reservoir with the neck of the bottle submerged below the level of the liquid in the reservoir, resulting in initial feeding at a generally uniform pressure head during depletion of liquid from within the bottle, followed by feeding at a decreasing pressure head during depletion of liquid from the reservoir below the bottle.

10 Claims, 5 Drawing Sheets

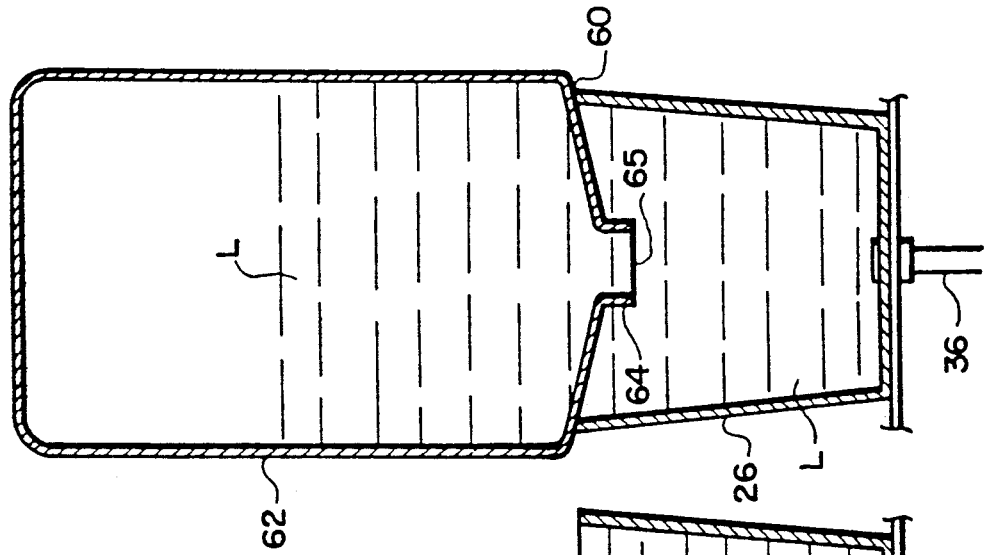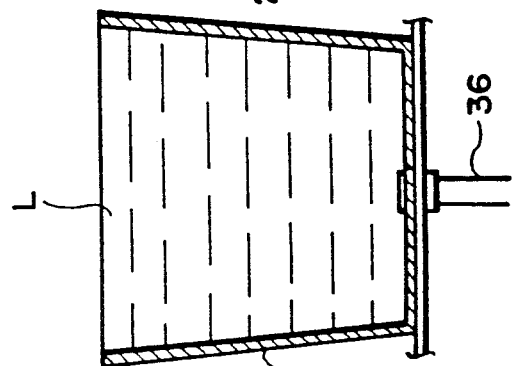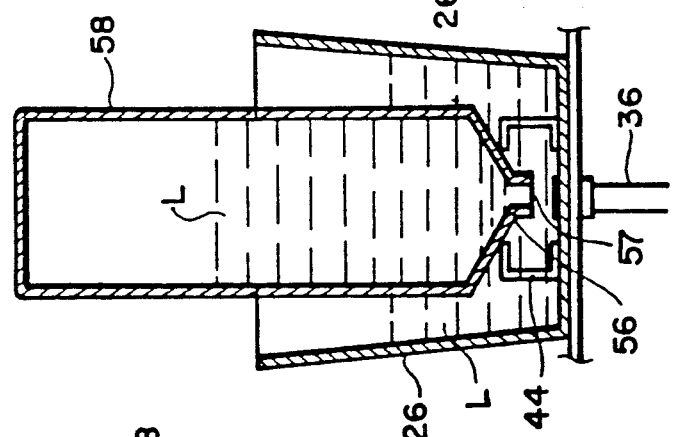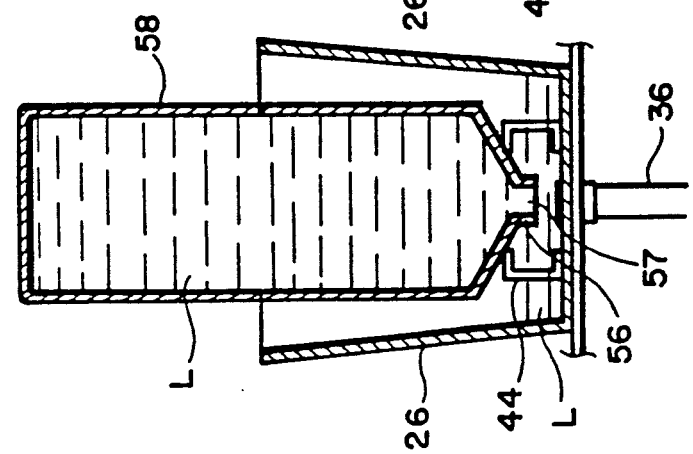

GAS GENERATING APPARATUS AND A METHOD OF FEEDING LIQUID THERETO

BACKGROUND OF THE INVENTION

The present invention relates to a gas generating apparatus and a method of feeding liquid thereto, and more particularly to such an apparatus and method in which liquid can be fed selectively in different manners for selective volumetric rates of gas generation.

Gas generators and methods are known for generating various types of gases, such as ethylene, for such uses as facilitating ripening of fruits, such as bananas, and vegetables, such as tomatoes, and for curing products, such as tobacco. Generators of this type normally include a housing containing a generating chamber disposed for receipt of a catalyst to facilitate generation of gas in the chamber, with the chamber opening through the housing for dispensing of generated gas therethrough to the atmosphere. A heater is used to heat the interior of the chamber to effect generation of gas from a liquid in the presence of the catalyst. The liquid is fed from a reservoir contained within the housing, with the liquid flowing from the bottom of the reservoir through a control valve and a conduit to the chamber, with the valve being actuated to control the rate of feed. In operation, liquid is poured into the reservoir, creating a pressure head that decreases as the liquid is depleted from the reservoir. This reduction in the pressure head results in a decreasing volumetric of gas generation such that the application of gas to the ripening or curing process decreases over time. Heretofore, no generator of this type has been capable of operation for selectively feeding liquid at a constant pressure head or a combination of a constant pressure head and a decreasing pressure head to provide gas generating rates best suited for particular ripening or curing processes.

In one type of prior gas generator, the reservoir is mounted within the housing for compactness, which limits the height of the liquid in the reservoir in relation to the chamber, therefore limiting the pressure head available and limiting the size and shape of the reservoir.

SUMMARY OF THE INVENTION

By the present invention, a gas generating apparatus and method of feeding liquid to a gas generating apparatus is provided wherein the feeding can be selective for feeding to generate gas at a decreasing volumetric rate, at a constant volumetric rate, at a decreasing volumetric rate followed by a constant volumetric rate, or at a constant volumetric rate followed by a decreasing volumetric rate. Thus a highly versatile generating apparatus and method is provided capable of adapting to different potential requirements.

Futher, the generating apparatus of the present invention utilizes a reservoir mounted on top of a frame, providing a substantial pressure head for effective operation and also permitting use of a reservoir of a size and shape unrestricted by the frame.

Briefly described, the gas generating apparatus of the present invention includes a frame on which a generating chamber is mounted. The chamber is open to the atmosphere for dispensing of generated gas therefrom. Means are provided for heating the interior of the chamber to effect generation of gas therein from a liquid. A reservoir is provided for containing a liquid to be fed to the chamber for generation of gas therefrom and having a lower portion and side walls upstanding from the lower portion with an opening in the lower portion. Conduit means communicate between the reservoir opening and the generating chamber, with the conduit means including a valve to control flow of liquid therethrough and means for actuating the valve. The reservoir is shaped for selective positioning of a container containing liquid with a lower opening in the container within the reservoir and being closed above the lower opening. Liquid is selectively fed to the chamber by pouring a supply of liquid into the reservoir, causing feeding at a decreasing pressure head and resulting gas generation at a decreasing volumetric rate, or by positioning a container containing liquid in the reservoir with liquid in the reservoir at the level of the container opening, causing feeding of liquid from the reservoir at a generally uniform pressure head and resulting gas generation at a generally uniform volumetric rate.

Further, the reservoir may be shaped for further selective feeding of liquid to the chamber by partially filling the reservoir with liquid and then placing the container at least partially submerged in the liquid in the reservoir with the container opening substantially below the level of the liquid in the reservoir for feeding at an initial decreasing pressure head during depletion of liquid from the reservoir to the level of the opening in the container followed by feeding at a generally uniform pressure head during depletion of liquid from the container and resulting gas generation at an initial decreasing volumetric rate followed by a generally uniform volumetric rate.

Preferably, the reservoir is shaped for alternatively positioning a container with a lower opening in the positioned container within the reservoir and at a substantial spacing above the opening in the reservoir and the container being closed above the container opening with liquid initially in the reservoir at the level of the container opening for selective feeding of liquid to the chamber at an initial generally uniform pressure head during depletion of liquid from the container followed by a decreasing pressure head during depletion of liquid from the reservoir below the container opening and resulting gas generation at an initial generally uniform volumetric rate followed by decreasing volumetric rate.

In the preferred embodiment of the present invention, the upstanding walls of the reservoir form a top rim spaced substantially above the opening in the reservoir for positioning the container on the top rim.

Also in the preferred embodiment, a container supporting bracket is supported on and upstanding from the lower portion of the reservoir for support of the container thereon, with the bracket having a top opening spaced above the reservoir opening and shaped for location of the container opening inwardly of and below the bracket opening. The bracket may be shaped for disposition of a container in the form of an inverted bottle with the neck of the bottle and the bottle opening within the bracket opening.

The method of the present invention performs the selective feeding described above with regard to the gas generating apparatus of the present invention.

Thus, the present invention provides an apparatus and method for generating gas selectively in different patterns to best suit the conditions of particular uses.

In addition, the gas generation apparatus of the present invention utilizes a reservoir that is mounted on top of the frame so that it is not limited in size or shape and can be located to contain liquid at a sufficient height to provide a desired pressure head for optimum feeding of liquid to the generating chamber.

Other and further features and advantages of the present invention will be apparent from the accompanying drawings and the following detailed description of the preferred embodiment.

BRIEF DESCRIPTION OF THE DRAWINGS

FIG. 4, B, C and D are schematic illustrations of selective arrangements for feeding liquid in different rate patterns according to the preferred embodiment of the present invention using the apparatus of FIGS. 1 and 2.

DETAILED DESCRIPTION OF THE PREFERRED EMBODIMENT

Figure 1:
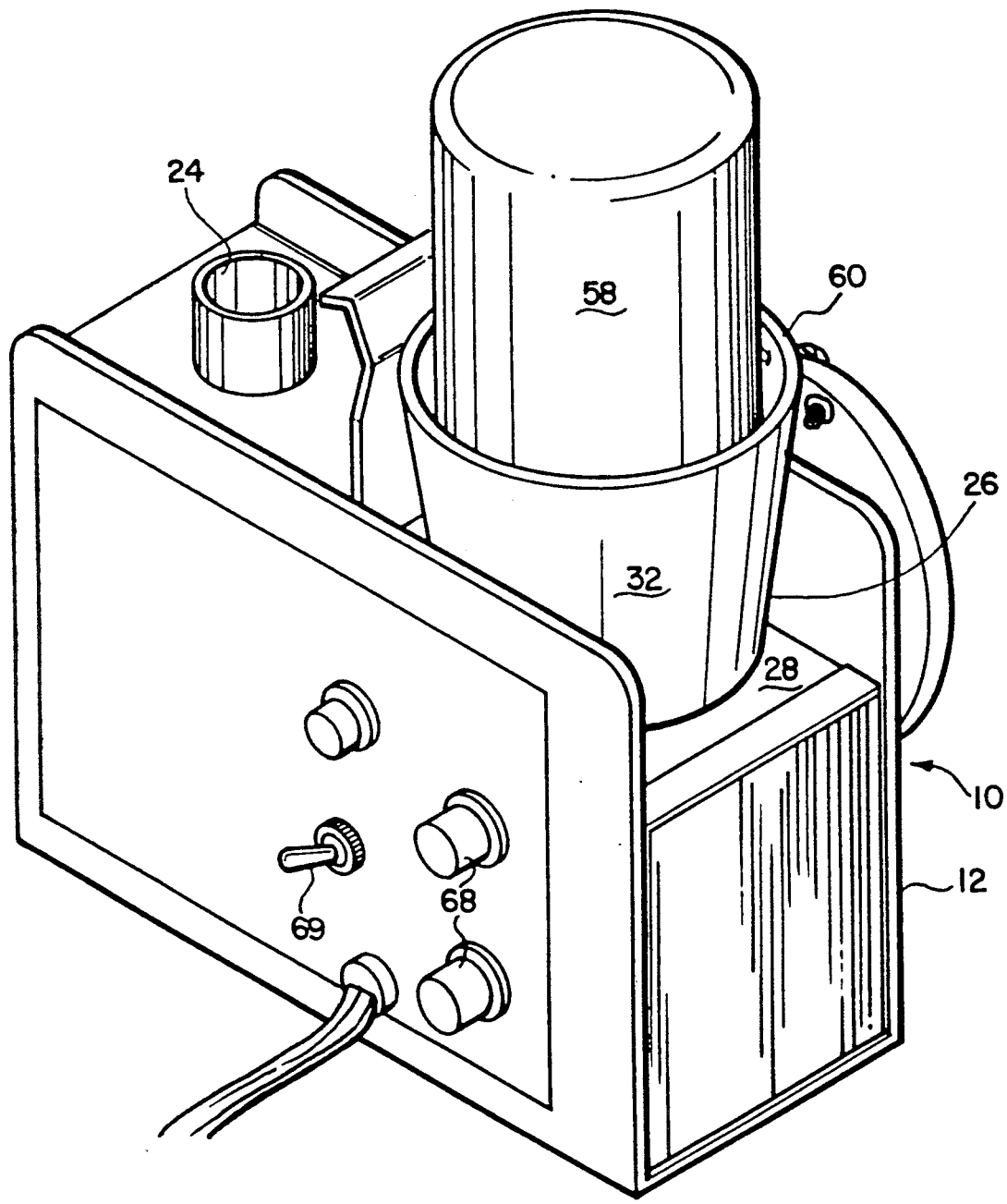
FIG. 1 is a perspective view of a preferred embodiment of the gas generating apparatus of the present invention.

The gas generating apparatus 10 of the illustrated preferred embodiment of the present invention includes a frame 12 on which a gas generating chamber 14 is disposed in an upright cylindrical configuration surrounded by insulating material 16 and containing a centrally located cylindrical heating element 18 that is mounted in spaced relation to the walls of the chamber 14 for receipt of granulated catalyst material between the heating element 18 and the walls of the chamber 14. Electrical controls 20 are provided for controlling the generation of heat by the heating element 18. The chamber 14 opens to the atmosphere for dispensing of generated gas therefrom and a screen 22 protects the opening 24 against entry of foreign matter.

A cup-shaped reservoir 26 is mounted on top of the frame 12 on a shelf portion 28 thereof offset from the heating chamber 14. This reservoir 26 has a lower portion in the form of a bottom wall 30 and has upstanding side walls in an inverted frusto-conical shape 32. An opening 34 is centrally located in the bottom wall 30 for feeding of liquid from the reservoir therethrough to conduit means 36 communicating between the reservoir bottom wall opening 30 and the generating chamber 14 adjacent its lower end. The conduit means includes a control valve 38 below the reservoir bottom wall 30 to control flow of liquid therethrough by a valve actuator 40. The conduit means 36 extends from the valve 38 in the form of a tube 42 to the generating chamber 14.

A bottle supporting bracket 44 is seated on and upstanding from the bottom wall 30 of the reservoir 26 and has a bottom opening 46 defined between two spaced horizontal flanges 48 projecting inwardly from two spaced vertical side walls 50 that depend from a top plate 52 having a circular top opening 54 formed therein at a spacing above the bottom opening 46. The vertical flanges 48 staddle the opening 34 in the bottom wall 30 of the reservoir 26 so that the bottom opening 46 of the bracket extends over the reservoir opening 26 without obstruction thereof, and the top opening 54 of the bracket 44 is shaped for receipt of the neck 56 of an inverted bottle 58 for support of the inverted bottle thereon with the bottle neck 56 and the bottle opening 57 within the bracket top opening 54.

Figure 2:
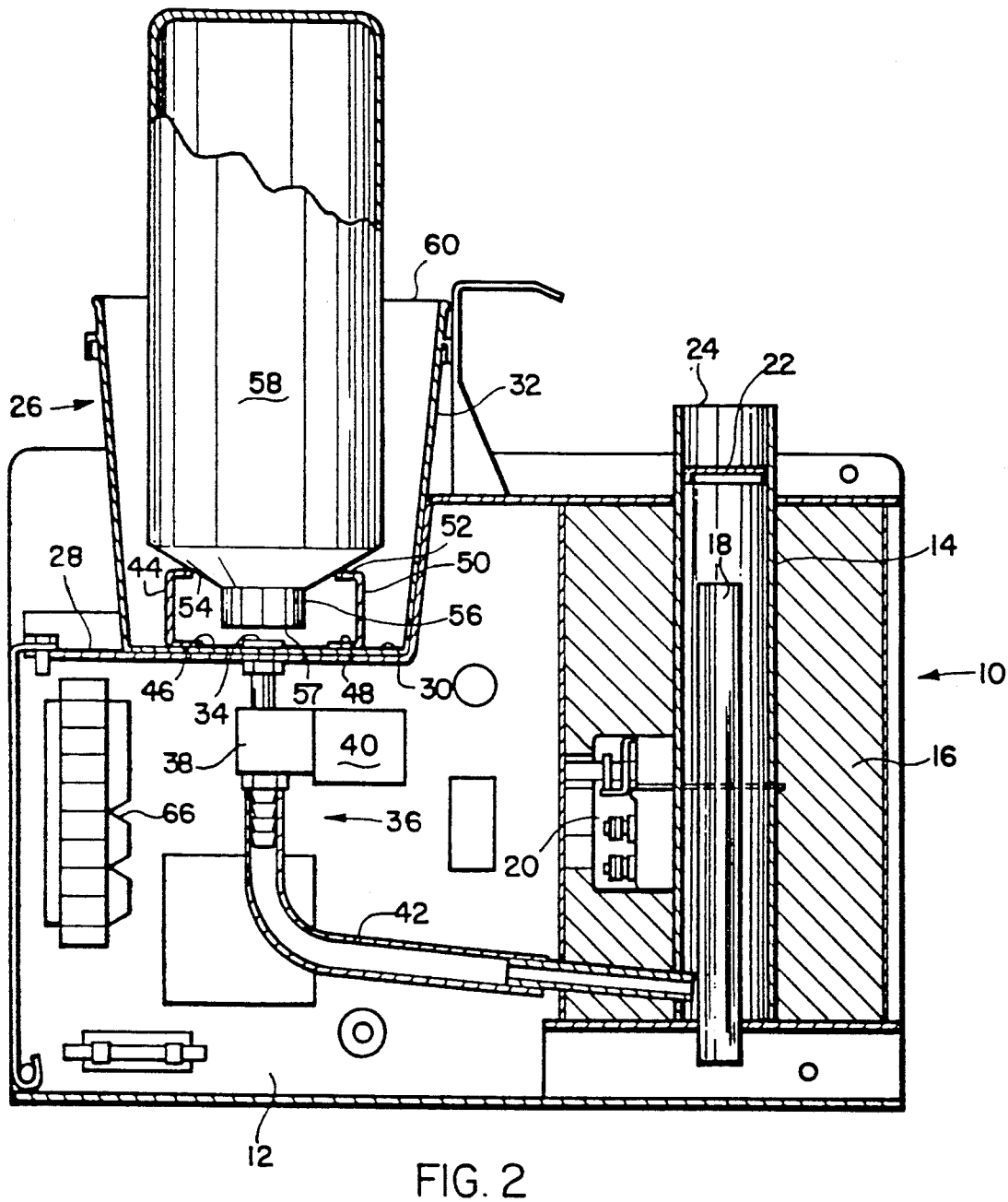
FIG. 2 is a transverse vertical sectional view of the gas generating apparatus of FIG. 1.
Figure 3:
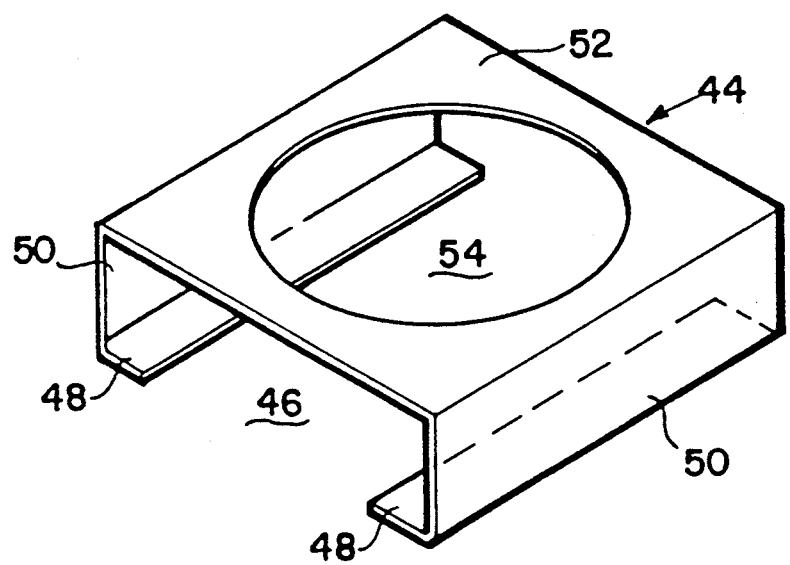
FIG. 3 is a perspective view of the bottle supporting bracket included in the apparatus of FIGS. 1 and 2.

As best seen in FIGS. 2 and 4, the inverted frusto-conical shape and the size of the reservoir 26 in relation to the shape and size of the inverted bottle 58 is such that the reservoir can be used for selective feeding of liquid L to the generating chamber 14 in different feeding patterns. Thus, a supply of liquid L can simply be poured into the reservoir 26, as illustrated in FIG. 4C, as is common in the prior art. This selected feeding results in feeding at a decreasing pressure head due to the reduction in the height of the liquid in the reservoir as the liquid is depleted. The reduced pressure head results in a decreasing flow of liquid L through the conduit means 36 and into the generating chamber 14, causing gas generation at a decreasing volumetric rate. Alternatively, the feeding can be selected to be performed as illustrated in FIG. 4A by placing the inverted bottle 58 of liquid with its neck 56 in the bracket 44. In this arrangement the liquid flows from the bottle into the reservoir to the level of the bottle opening 57 and then feeding continues from the interior of the bottle 58 at a substantially constant pressure head due to the bottle being closed above the liquid level. This substantially constant pressure head produces a generally uniform flow of liquid L through the conduit means 36 to the generating chamber 14, thereby causing gas generation at a generally uniform volmetric rate.

The selective feeding using the illustrated embodiment can also be alternatively performed by first partially filling the reservoir 26 with liquid L and then placing the inverted bottle 58 on the bracket 44, as illustrated in FIG. 4B. With this arrangement, the bottle 58 is partially submerged in the liquid in the reservoir with the level of the liquid well above the level of the bottle opening 57. Feeding with this arrangement results in an initial feeding of the liquid from the reservoir 26 between the reservoir wall 32 and the bottle 58 until the level of the liquid is lowered to the general level of the bottle opening 57. During this lowering of the liquid level in the reservoir 26, the pressure head decreases, causing a decrease in the volumetric rate of gas generation. This initial decreasing pressure head during depletion of liquid from the reservoir surrounding the inverted bottle is followed by a generally uniform pressure head during depletion of liquid from within the bottle, thereby causing gas generation at a generally uniform volumetric rate after the initial decreasing rate.

A further alternative selective feeding is obtained by using the top rim 60 of the reservoir 26 to support a large bottle 62 of liquid L as illustrated in FIG. 4D. For this purpose, the top rim 60 is spaced substantially from the reservoir bottom wall 30 and is of a relatively large diameter for support of the inverted large bottle 62 near the side walls thereof for firm support. With this arrangement, liquid can be selectively fed by first filling the reservoir 26 with liquid L to a level at least as high as the level of the opening 65 at the end of the neck 64 of the large bottle 62 when it is supported on the top rim 60 of the reservoir 26. The bottle 62 is then positioned on the reservoir 26 with its neck 64 extending into the liquid and its opening 65 in the liquid. When the apparatus is activated, the liquid L will first feed from the bottle 62 at a generally uniform pressure head due to the bottle being closed above the level of liquid therein. This results in an initial generally uniform volumetric rate of gas generation. When all of the liquid L has flowed from the bottle 62. the pressure head will then be the head of liquid in the reservoir 26. which will decrease as the liquid is depleted. thereby causing a decreasing volumetric rate of gas generation in the generating chamber 14.

In commercial practice of the present invention. the apparatus and method is used for generating ethylene in ripening bananas and tomatoes and in curing tobacco. The liquid used is a commercially available ethanol composition sold by Union Carbide Corportation under the trade name ANHYDROL® SOLVENT, PM 4085. consisting of 90% ethyl alcohol. 4.7% ethyl acetate. 4.5% methyl alcohol and less than 1% of (hexone) methyl isobutyl ketone. Using this composition in the selective feeding methods illustrated and described in relation to FIG. 4A. B. C and D results, as plotted on the graph of FIG. 5. are expected with the control settings indicated. These settings are made by adjusting the controls 66 whose knobs 68 project from the frame 12 (FIG. 1). Thus, the operator adjusts the cycle time in total hours and the selected method of feeding. The on-off switch 69 is then switched to activate the generator and the selected feeding method is performed.

Figure 5:
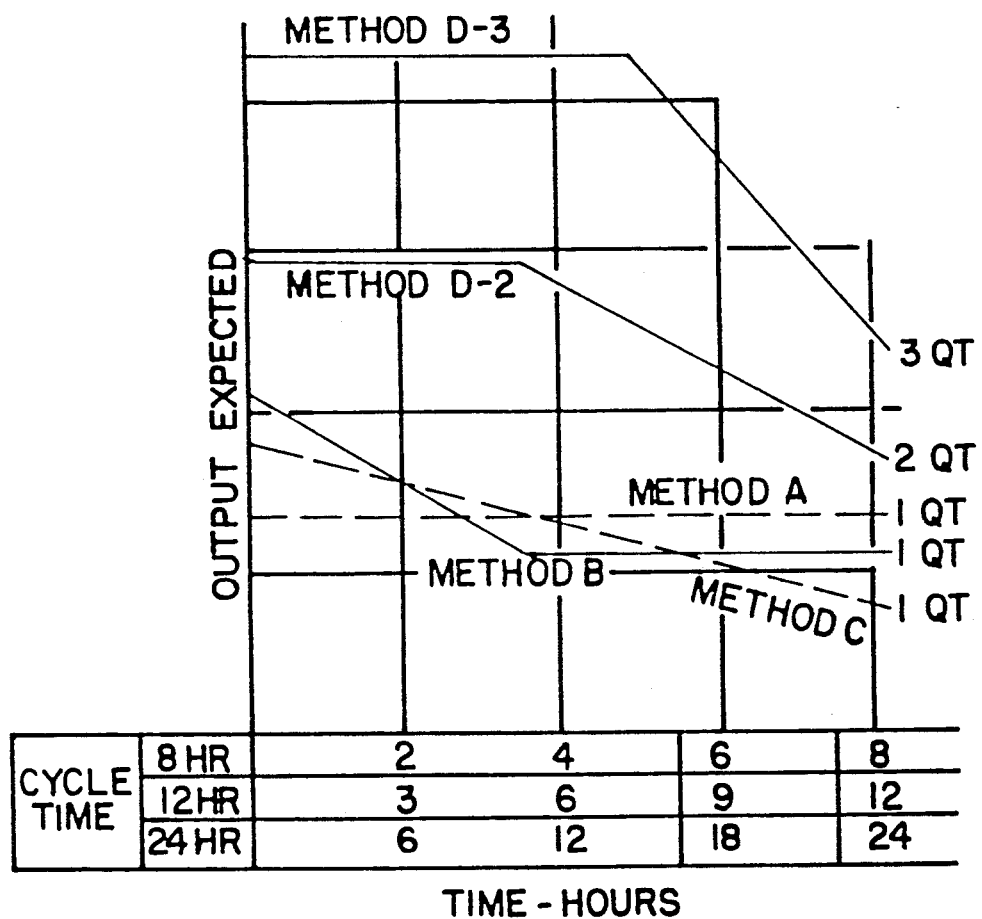
FIG. 5 is a graph illustrating the feeding rate patterns resulting from use of the various arrangements of FIG. 4.

With reference to FIG. 5. a generally uniform volumetric rate of gas generation is obtained using Method A in the manner described with respect to FIG. 4A. An initially decreasing volumetric rate of gas generation followed by a generally uniform volumetric rate of gas generation is obtained with Method B in the manner described with respect to FIG. 4B. A decreasing volumetric rate of gas generation is obtained using Method C in the manner described with respect to the 4C. In each of these Methods A. B and C initial volume of liquid in the bottle 58 and reservoir 26 is one quart.

When a large bottle 62 of liquid L is used in the manner described with respect to FIG. 4D. a quantity of one. two. three or four quarts of liquid or some other variation of this amount. is fed from the inverted large bottle 62 into the reservoir 26 in which a quart of liquid L has previously been poured so that the opening 65 of the large bottle 62 will be below the liquid level. As indicated by the flow pattern of Method D-2. a feeding of one quart of liquid from a bottle into a reservoir containing one quart of liquid results in an initial generally uniform rate of gas generation substantially higher than the one quart feeding of Methods A. B and C followed by a decreased volumetric rate of gas generation. In FIG. 5. Method D-3 illustrates the flow pattern for three quarts of liquid when a bottle containing two quarts of liquid is inverted on the reservoir 26 containing one quart of liquid. In this case, the pattern is similar to that of Method D-2 but at higher generating rates.

As will be understood, there will be slight fluctuations in the generally uniform pressure head due to slight lowering of the liquid level at the bottle opening until it is low enough for air to enter the opening, allowing an increment of liquid to flow from the opening into the reservoir again covering the opening. which occurs frequently until the liquid is depleted from the bottle. However, this fluctuation is substantially insignificant in the commercial practice of the present invention.

In some uses of the present invention, particularly with the large bottles of FIG. 4D, the bottle may contain enough liquid for several gas generating cycles, in which case the cycles performed prior to complete depletion of liquid from the bottle will be performed at a generally uniform pressure head. resulting in a generally uniform volumetric rate of gas generation. If this is not desirable. the bottle can start with a lesser quantity of liquid so that the cycle includes operation with a decreasing pressure head following the initial generally uniform pressure head feeding.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A gas generating apparatus comprising a frame, a generating chamber mounted on said frame and disposed for generation of gas therein, said chamber opening to the atmosphere for dispensing of generated gas therefrom, means for heating the interior of said chamber to effect generation of gas therein from a liquid, a reservoir for containing a liquid to be fed to said chamber for generation of gas therefrom and having a lower portion and side walls upstanding from the lower portion with an opening in said lower portion, conduit means communicating between said reservoir opening and said generating chamber, said conduit means including a valve to control flow of liquid therethrough and means for actuating said valve, and a container supporting bracket supported on and upstanding from the lower portion of the reservoir for support of a container containing liquid thereon, said bracket having a top opening spaced above the reservoir opening and shaped for location of a lower opening of the container inwardly of and below said bracket opening, said reservoir being shaped for selective positioning of the container with its lower opening within the reservoir and being closed above the lower opening, for selective feeding of liquid to the chamber by pouring a supply of liquid into the reservoir, causing feeding at a decreasing pressure head and resulting gas generation at a decreasing volumetric rate, or by positioning a container containing liquid in said reservoir with liquid in the reservoir at the level of the container opening, causing feeding of liquid from the reservoir at a generally uniform pressure head and resulting gas generation at a generally uniform volumetric rate.

2. A gas generating apparatus according to claim 1 and wherein said reservoir is shaped for further selective feeding of liquid to the chamber by partially filling the reservoir with liquid and then placing the container at least partially submerged in the liquid in the reservoir with the container opening substantially below the level of the liquid in the reservoir for feeding at an initial decreasing pressure head during depletion of liquid from the reservoir to the level of the opening in the container followed by feeding at a generally uniform pressure head during depletion of liquid from the container and resulting gas generation at an initial decreasing volumetric rate followed by a generally uniform volumetric rate.

3. A gas generating apparatus according to claim 1 or 2 and wherein said reservoir is shaped for alternatively positioning a container with a lower opening in the positioned container within the reservoir and at substantial spacing above the opening in the reservoir and the container being closed above the container opening with liquid initially in the reservoir at the level of the container opening for selective feeding of liquid to said chamber at an initial generally uniform pressure head during depletion of liquid from the container followed by a decreasing pressure head during depletion of liquid from the reservoir below the container opening and resulting gas generation at an initial generally uniform volumetric rate followed by a decreasing volumetric rate.

4. A gas generating apparatus according to claim 1 and wherein said bracket is shaped for disposition of a container in the form of an inverted bottle with the neck of the bottle and the bottle opening within the bracket opening.

5. A method of feeding liquid to a gas generating apparatus having a frame, a generating chamber mounted on said frame for generation of gas therein with the chamber opening to the atmosphere for dispensing generated gas therefrom, a reservoir for containing a liquid to be fed to the chamber, conduit means communicating between the reservoir and the chamber with valve means for controlling flow of liquid therethrough, wherein liquid fed from the reservoir through the conduit to the chamber as controlled by the valve means is heated in the chamber to generate gas, said method of feeding comprising feeding selectively by pouring a supply of liquid into the reservoir to feed liquid from the reservoir to the chamber at a decreasing pressure head and resulting gas generation at a decreasing volumetric rate, or by positioning a container of liquid in the reservoir with liquid in the reservoir at the level of an opening in the container above which the container is closed for feeding liquid at a generally uniform pressure head and resulting gas generation at a generally uniform volumetric rate.

6. A method for feeding liquid to a gas generating apparatus according to claim 5 and wherein said feeding selectively includes selectively partially filling the reservoir with liquid and then placing the container of liquid at least partially submerged in the liquid in the reservoir with the container opening substantially below the level of the liquid in the reservoir to feed liquid from the reservoir to the chamber at an initial decreasing pressure head during depletion of liquid from the reservoir to the level of the opening in the container followed by feeding at a generally uniform pressure head during depletion of liquid from the container and resulting gas generation at an initial decreasing volumetric rate followed by a generally uniform volumetric rate.

7. A method for feeding liquid to a gas generating apparatus according to claim 5 or 6 and further comprising alternatively positioning a container with a lower opening in the positioned container within the reservoir and at a substantial spacing above the opening in the reservoir and the container being closed above the container opening with liquid initially in the reservoir at the level of the container opening for selective feeding of liquid to the chamber at an initial generally uniform pressure head during depletion of liquid from the container followed by a decreasing pressure head during depletion of liquid from the reservoir below the container opening and resulting gas generation at an initial generally uniform volumetric rate followed by a decreasing volumetric rate.

8. A method of feeding liquid to a gas generating apparatus having a frame, a generating chamber mounted on said frame and disposed for generation of gas therein with the chamber opening to the atmosphere for dispensing generated gas therefrom, a reservoir for containing a liquid to be fed to the chamber and having a lower portion and side walls upstanding from the lower portion with an opening in the lower portion, conduit means communicating between the reservoir opening and the chamber with valve means for controlling flow of liquid therethrough, wherein liquid fed from the reservoir through the conduit to the chamber as controlled by the valve means is heated in the chamber to generate gas, said method of feeding comprising positioning a container with a lower opening in the positioned container within the reservoir and at a substantial spacing above the opening in the reservoir and the container being closed above the container opening with liquid initially in the reservoir at the level of the container opening for feeding of liquid to the chamber at an initial generally uniform pressure head during depletion of liquid from the container followed by a decreasing pressure head during depletion of liquid from the reservoir below the container opening and resulting gas generation at an initial generally uniform volumetric rate followed by a decreasing volumetric rate.

9. A method of feeding liquid to a gas generating apparatus according to claim 8 wherein the upstanding walls form a top rim spaced substantially above the opening in the reservoir and said positioning includes supporting a container on the top rim of the reservoir.

10. A method of feeding liquid to a gas generating apparatus according to claim 5, 6 or 9 wherein the container is a bottle having an opening at its top and characterized wherein said positioning includes inverting the bottle and positioning the inverted bottle with its opening within the reservoir.

* * * * *

UNITED STATES PATENT AND TRADEMARK OFFICE
CERTIFICATE OF CORRECTION

PATENT NO. : 5,116,580
DATED : May 26, 1992
INVENTOR(S) : Robert W. Wilson It is certified that error appears in the above-identified patent and that said Letters Patent is hereby corrected as shown below:

Column 1, line 30, after "volumetric" insert -- rate --.

Column 1, line 57, delete "Futher" and insert therefor -- Further --.

Column 3, line 18, delete "4," and insert therefor -- 4A, --.

Column 5, line 10, delete "Corportation" and insert therefor -- Corporation --.

Column 5, line 33, after "C" insert -- the --.

Column 5, line 49, after "bottle" insert -- 62 --.

Column 7, line 8, after "at" insert -- a --.

Column 8, lines 53-54, delete "characterized".

Signed and Sealed this

Seventeenth Day of August, 1993

*Attest:*

BRUCE LEHMAN

*Attesting Officer*  *Commissioner of Patents and Trademarks*